May 12, 1970     D. J. MARLEY     3,511,544
LINEAR SELF-ACTING BEARING WITH CONFORMABLE SURFACE
Filed Aug. 11, 1967     2 Sheets-Sheet 1
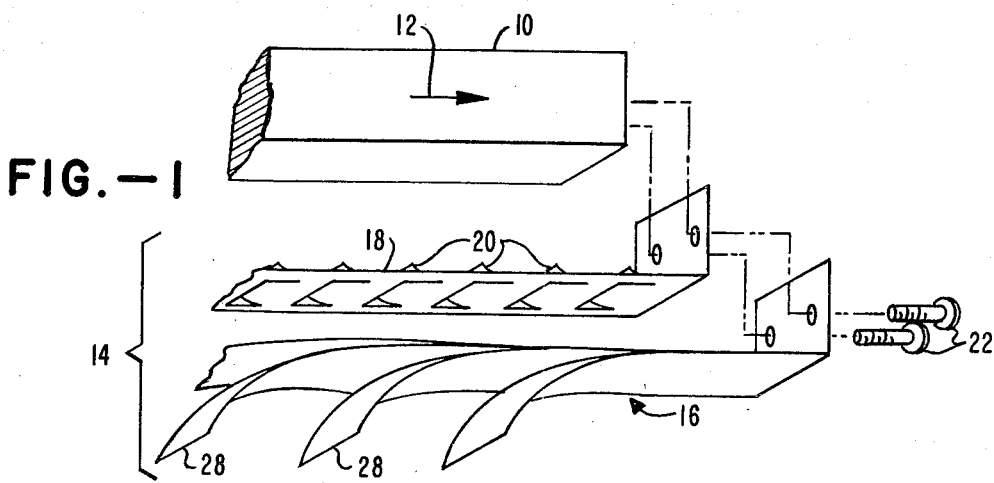
FIG.—1
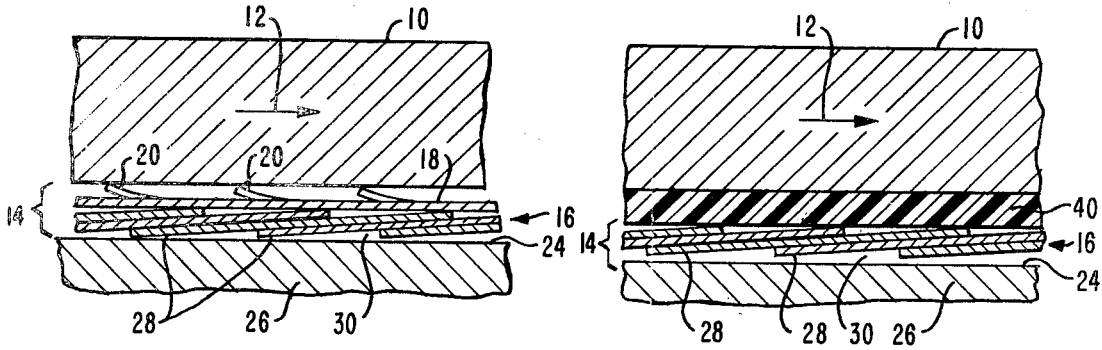
FIG.—2     FIG.—3
FIG.—8
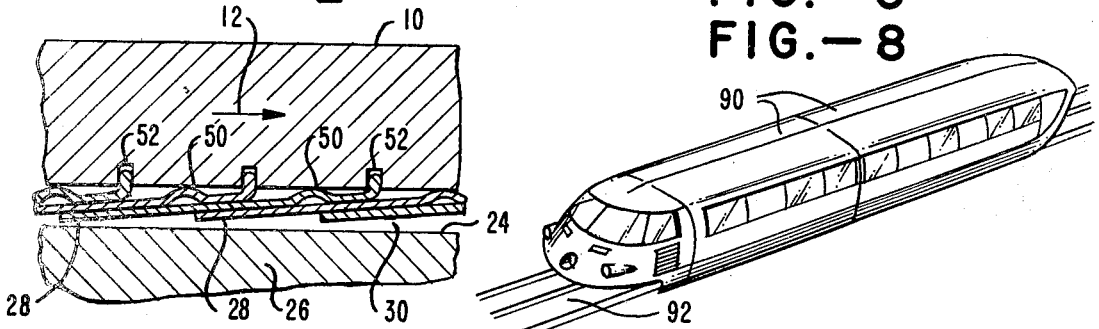
FIG.—4
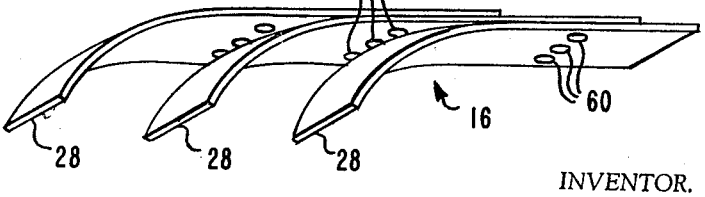
FIG.—5
INVENTOR.
DAVID J. MARLEY
BY
*Fraser and Bogucki*
ATTORNEYS

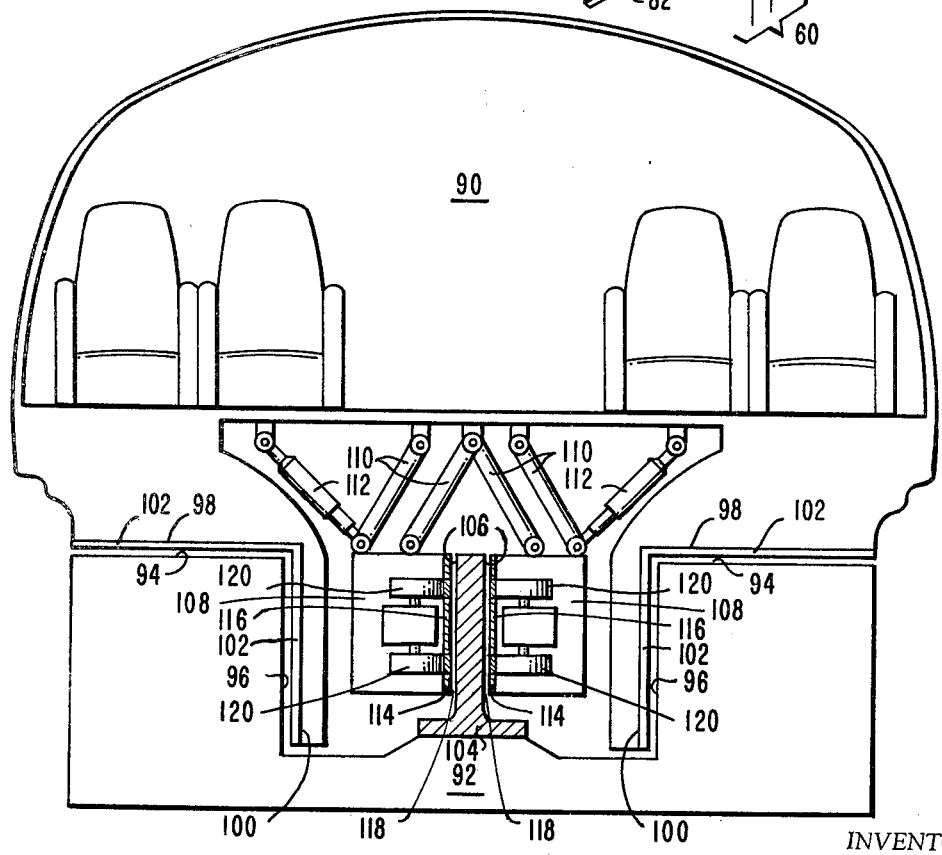

United States Patent Office 3,511,544
Patented May 12, 1970

---

3,511,544
LINEAR SELF-ACTING BEARING WITH CONFORMABLE SURFACE
David J. Marley, Buena Park, Calif., assignor to The Garrett Corporation, a corporation of California
Filed Aug. 11, 1967, Ser. No. 660,117
The portion of the term of the patent subsequent to May 7, 1985, has been disclaimed
Int. Cl. F16c 29/00, 29/02
U.S. Cl. 308—3         10 Claims

ABSTRACT OF THE DISCLOSURE

There is disclosed herein a linear fluid lubricated bearing using foils as bearing surfaces. The bearing is rigidly affixed relative to one of a pair of members which are capable of undergoing linear motion relative to one another with the foils disposed to bear against a planar surface of the other of said pair of members. In self-acting or hydrodynamic bearings, relative movement between the foils and the planar surface develops viscous shear which, in turn, provides a lubricating film of appropriate fluid which may be either liquid or gas. The foils, which are preferably interleaved in shingle fashion, may be resiliently mounted and may comprise all metal sheets, all plastic sheets, or a combination of the two.

BACKGROUND OF THE INVENTION

Field of the invention

The invention pertains to linear fluid lubricated bearings for use with elements undergoing relative linear motion, and more particularly to bearings of this type utilizing foils as bearing surfaces.

Description of the prior art

Linear bearings have been developed to a much lesser extent than rotational bearings. Heretofore, bearings for linear applications have typically relied upon ball or roller type elements in actual surface engagement with opposing bearing surfaces, and apparently little if anything has been done in connection with linear bearings utilizing a fluid film between opposing bearing elements. Known linear bearings are generally unsatisfactory for relatively high speed operation either because of their reliance upon direct physical contact or because of the rather close tolerances required.

It has been found that hydrodynamic (self-acting) bearings can be constructed for applications involving various speeds and, in particular, high speeds without the necessity for meeting precision tolerances typical of conventional self-acting bearings with respect to the bearing surfaces, by providing a bearing structure in which foils comprising thin, flexible sheets are inserted in the bearing region, the sheets having a thickness relative to other dimensions such that the sheets may be locally deflected by film forces between adjacent bearing surfaces and the foils. However, the use of foils has heretofore been limited to rotational bearings such as those of the journal and thrust type. For examples of rotational foil bearings, see Pats. 3,215,479 of A. Silver et al. and 3,215,480 of David J. Marley, both assigned to the assignee of the present application. The present invention provides linear foil bearings which do not require precise tolerances and which eliminate the problems present with known linear bearings. The bearings of the invention are effective at medium to high speeds under virtually all conditions; and are effective at low speeds under conditions of light load and short duration.

SUMMARY OF THE INVENTION

The present invention provides linear, fluid-lubricated, foil bearings for use with elements undergoing relative linear motion. In accordance with the invention, an arrangement including a plurality of relatively thin foils is fixedly mounted relative to one element and disposed adjacent a substantially planar surface of another element. With the two elements undergoing relative linear motion in a direction parallel to the planar surface, viscous shear between the foils and the planar surface develops a fluid film therebetween to provide the necessary lubrication. Alternatively, the fluid film may be developed from a pressurized system driven by a pump or compressor.

Resilient means may be provided, if desired, between the foils and the element relative to which the foils are rigidly affixed, the resilient means providing improved bearing operation and further reducing the requirement for precise tolerances among the various bearing components. The resilient means may comprise an element such as a layer of foam rubber or a strip of metal having outwardly sprung tabs. Alternatively, the desired resiliency may be provided by fashioning the foils with convoluted sections.

The foil assembly of the invention may include different foil arrangements as desired. In one arrangement, each foil is individually secured to the element which the foils are to support. Other arrangements may include overlapping foils with each foil rigidly affixed either to an adjacent foil or to a common base member. The foils may comprise sheets of the same or different material such as metal and plastic. In one foil arrangement, foils of different materials are rigidly affixed in pairs to a common base so that like materials may be bonded together. An example of the usefulness of the foil arrangements of the invention may be found in a linear induction motor wherein such arrangements may be utilized to provide conformance at close tolerance between a primary member and a secondary member undergoing relative linear motion and to provide an air gap therebetween, the air gap being utilized as the load distributing and supporting film bearing for the two members.

BRIEF DESCRIPTION OF THE DRAWINGS

A better understanding of the present invention may be had from a consideration of the following detailed description, taken in conjunction with the accompanying drawings, in which:

FIG. 1 is a partially disassembled view of one particular linear bearing arrangement in accordance with the invention;

FIG. 2 is a sectional view of the arrangement of FIG. 1;

FIG. 3 is a sectional view of another bearing arrangement in accordance with the invention;

FIG. 4 is a sectional view of yet another bearing arrangement in accordance with the invention;

FIG. 5 is a diagrammatic view of one particular foil arrangement in accordance with the invention;

FIG. 6 is a diagrammatic view of another foil arrangement in accordance with the invention;

FIG. 7 is a partially disassembled view of still another foil arrangement in accordance with the invention;

FIG. 8 is a perspective view of a high speed rapid transit system; and

FIG. 9 is a cross-sectional view of one of the transit vehicles of FIG. 8 showing a linear induction motor arrangement utilizing the linear bearing arrangements of the present invention.

DESCRIPTION OF THE PREFERRED EMBODIMENTS

A typical arrangement of a linear foil bearing in accordance with the invention is illustrated in disassembled form in FIG. 1. A movable member 10, which is capable of undergoing linear motion in the direction indicated by the arrow 12, is provided with a foil bearing assembly 14 including a foil arrangement 16 and a resilient element 18 which, in this instance, comprises a strip of metal having a plurality of outwardly sprung tabs 20. The foil arrangement 16 and resilient element 18 are fixedly mounted relative to the movable member 10 by any appropriate means, a pair of bolts 22 being illustrated in FIG. 1 by way of example only.

The resilient element 18 is shown disposed between the foil arrangement 16 and the movable member 10, and provides resiliency therebetween by means of the outwardly sprung tabs 20. It should be understood that the resilient element 18 is not essential to the successful operation of the bearings of the present invention, but does provide for superior results and permits greater tolerances for reasons which will become more fully apparent from the discussion to follow.

As best illustrated in FIG. 2, the foil assembly 14 is disposed adjacent a substantially planar surface 24 of a fixed member 26. The foil arrangement 16 preferably comprises a plurality of foils 28 which are overlapped or interleaved in shingle fashion, the loose ends of the foils 28 opposite the mounted ends being disposed adjacent the planar surface 24 and extending generally in a direction opposite the direction of motion indicated by the arrow 12. It should be understood that the members 10 and 26 are respectively disclosed as being movable and fixed for purposes of illustration only and that either of the members can be movable. The only criterion is that the movable member undergo linear motion in a direction which is substantially parallel to the planar surface 24 and that the planar surface 24 always move relative to the foils 26 in the direction of foil overlap. In other words, if the member 10 is made a fixed member, the member 26 must move in a direction opposite the arrow 12 with the foils 28 arranged as shown.

Movement of the member 10 and the associated foil assembly 14 relative to the fixed member 26 develops viscous shear which causes a fluid to be drawn into the space 30 between the foils 28 and the planar surface 24. This fluid which serves as the lubricant for the bearing can be either a liquid or a gas, liquids being preferred for relatively slow speeds and gas for relatively high speeds. Linear bearings such as the one illustrated in FIGS. 1 and 2 are hydrodynamic or self-acting, in that the fluid film is provided by the viscous shear developed between the foils 28 and the planar surface 24, and the bearings thereby supply their own lubricant.

The foil assembly 14 is disclosed herein as being used in conjunction with a substantially planar surface 24. The surface 24, however, need not be absolutely flat and the finish thereon need not be absolutely smooth. The only requirement is that the surface waviness and finish be compatible with the speed of the member 10, the viscosity of the fluid film, and the bearing load or force exerted on the foil assembly 14. The thickness of the fluid film should be at least an order of magnitude greater than the peak-to-peak height of any variations in the finish of the surface 24. Any waviness present in the planar surface 24 should not exceed the conformability of the bearing, the conformability being considerably increased when the resilient element 18 is present.

An alternative arrangement of a linear bearing in accordance with the invention is illustrated in FIG. 3. The arrangement of FIG. 3 is substantially the same as that of FIGS. 1 and 2 except that a different type of resilient element 18 is used. In the arrangement of FIG. 3, the resilient element comprises a layer of foam, plastic or rubber 40 having substantially uniform thickness in a direction normal to the planar surface 24.

A further alternative arrangement of a linear bearing in accordance with the invention is illustrated in FIG. 4 wherein no resilient element 18 is present. Instead, each of the foils 28 includes a convoluted portion 50 extending in a direction generally perpendicular to the direction of motion of the member 10. The convoluted portions 50 extend to engage the underside of the movable member 10 and compliantly spread out in response to bearing load forces to provide the desired resiliency. The foils 28 are shown individually mounted on the movable member 10, the forward end of each foil extending into and being secured within a slot 52 disposed in the bottom surface of the movable member 10 and extending in a direction generally perpendicular to the direction of motion.

Several alternatives to the foil arrangement 16 illustrated in FIGS. 1–3 are illustrated in FIGS. 5–7. It should be understood, however, that any appropriate foil arrangement may be used within the scope of the invention. The foils 28 are relatively thin sheets of flexible material, a typical thickness being a few thousandths of an inch, and may comprise all metal sheets, all plastic sheets, or a combination of the two. In the arrangement of FIG. 5, the foils 28 are of like material, either metal or plastic, and each foil is affixed to an adjacent foil. Where metal foils are used, each foil is appropriately affixed to the adjacent foil such as by a plurality of spot welds 60. Where plastic foils are used, however, adjacent foils are affixed to one another by any appropriate bonding means such as a very strong adhesive.

In the foil arrangement of FIG. 6, each of the foils 28 is affixed to a common base. The common base may comprise a separate elongated strip 70 or it may comprise the bottom surface of the movable member 10 (not shown in FIG. 6). The use of the base strip 70 is advantageous where the foil assembly is to include a resilient element 18, in that the side of the strip 70 opposite the foils 28 can be mounted directly on the resilient element 18. The foils 28 are affixed to the common base by any appropriate means such as spot welds 60 in the case of metal foils or adhesive bonding in the case of plastic foils. The foil arrangements of FIGS. 5 and 6 preferably utilize foils of like material since the spot welds or cement bonds are most easily accomplished between like materials. Similarly, the base strip 70 in FIG. 6 is preferably the same material as the foils 28.

The foil arrangement of FIG. 7 is preferred where foils of different material are to be used. A plurality of plastic (preferably Teflon) sheets 80 are alternatively interleaved with metal sheets 82, each of the metal sheets 82 being spot welded to a metal base strip 84 through a plurality of holes 86 in the interleaved plastic sheet. The Teflon advantageously minimizes metal-to-metal contact in the bearing and also is the source of a thin film which builds up on the bearing surfaces for added lubrication where the bearing surfaces actually touch, as in certain overload conditions for example.

One practical example of the usefulness of the linear bearings of the present invention is a linear induction motor arrangement utilized in a rapid transit system. The rapid transit system is generally illustrated in FIG. 8 wherein a pair of transit vehicles 90 are supported by a track 92 for high speed movement relative thereto. The track 92 may be any appropriate support member such as the ground or an elevated platform configured to receive the vehicles 90.

FIG. 9 is a sectional view of a vehicle 90 and the track 92 of FIG. 8 illustrating a linear induction motor arrangement used to propel the vehicle relative to the track. The vehicle 90 and track 92 respectively comprise the primary and secondary members of a linear induction motor, and are accordingly referred to as such in the discussion to follow. The secondary member 92 has opposite substantially planar horizontal surfaces 94 and vertical surfaces 96 which mate with planar surfaces 98 and 100 on the underside of the primary member 90. The primary member 90 is supported for motion relative to the secondary member 92 by foil assemblies 102 mounted on the planar surfaces 98 and 100 thereof. The foil assemblies 102 are arranged in accordance with the present invention and develop thin films of air to support the primary member 90.

The secondary member 92 includes an upwardly extending secondary rail 104 disposed between the opposite planar surfaces 96 of the primary member, and presenting vertical, substantially planar surfaces 106 on the opposite sides thereof. A pair of sliders 108 are disposed on opposite sides of the secondary rail 104 adjacent to planar surfaces 106. The sliders are suspended from the primary member 90 by a plurality of pivotably mounted arms 110 and pneumatic or hydraulic load distributor devices 112 which permit limited lateral and vertical motion of the sliders in a manner such that a flat surface 114 of each slider remain substantially parallel to and adjacent a respective one of the rail surfaces 106. Each of the slider surfaces 114 is provided with a foil assembly 116 which may comprise any of the arrangements shown in FIGS. 1 through 7.

The primary member 90 includes any appropriate means (not shown) for providing a magnetic field. In one example, the field generating means comprises an engine-generator combination, the engine driving the generator and the generator current being passed to coils in the sliders 108 to develop the magnetic field. The magnetic field is directed through the foil assemblies 116 and adjacent air gaps 118 to the secondary rail 104 wherein secondary currents are induced. The secondary rail 104 may be fashioned of any appropriate material or materials so long as it is electrically conductive along the length thereof. For example, the rail 104 may be made entirely of copper, or alternatively it may comprise aluminum with iron slugs or steel with an aluminum jacket. The interaction between the magnetic field of the primary member 90 and the induced magnetic field in the secondary rail 104 propels the primary member 90 providing the desired motion relative to the secondary member 92. It will be noted that, whereas typical rotational induction motors include a stator which provides the primary magnetic field and a rotor wherein currents are induced to interact with the magnetic field of the stator, the linear induction motor of FIG. 9 comprises a movable slider or primary member 90 which provides the magnetic field and a fixed stator or secondary member 92 into which currents are induced to interact with the magnetic field of the slider. Thus, in the arrangement of FIG. 9, the field producing member is the movable one.

It has been found that, for a given speed of the primary member 90 relative to the secondary member 92, the air film thickness between the slider foil assemblies 116 and the secondary rail 104 varies substantially inversely with the lateral bearing load exerted on the foil assemblies 116. Furthermore, for a given bearing load, the minimum film thickness increases with the speed of the primary member 90. For a given speed, the power loss caused by drag between the sliders 108 and the secondary rail 104 varies substantially directly with the lateral bearing load, and for a given bearing load, the power loss due to drag increases with speed.

The pneumatic or hydraulic load distributor devices 112 provide resiliency to compensate for waviness in the rail 104 and to evenly distribute the lateral load over the entire slider surfaces 114. With the sliders 108 fashioned in lengths of approximately 15 feet, the secondary rail 104 may be curved to an extent sufficient to provide the necessary curvature in the secondary member 92 for high speed transportation systems. It has been found that a minimum film thickness between the rail surfaces 106 and the slider foil assemblies 116 of approximately .001 inch is desirable. This thickness prevents damaging contact between the foil assemblies 116 and the rail surfaces 106 at normal operating speeds due to momentary overload conditions and the like. At low speed, where the film thickness is insufficient to prevent contact between the foil assemblies 116 and the rail 104, such as where the primary member 90 is accelerating from rest or decelerating to a stop, solenoid operated wheels 120 mounted within the sliders 108 may be extended beyond the foil assemblies 116 to engage the secondary rail 104.

The waviness of the rail 104 can exceed the minimum film thickness since the substantially long sliders 108 conform to shape at the rail. However, surface roughness of the rail 104 must be kept to a fraction of the minimum film thickness. The rail 104 may be provided with the necessary surface smoothness such as by grinding the rail after it is installed in the track. Rail surfaces finished to 16 micro-inches RMS are considered satisfactory in the arrangement described.

Although there have been described hereinabove particular arrangements of a linear foil bearing and foil assembly for such in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A linear foil bearing device for use between a first member having a substantially planar surface and second member, one of said members being capable of undergoing motion relative to the other member in a direction parallel to the planar surface of the first member, comprising a foil assembly mounted on said second member and including a plurality of foils disposed adjacent the planar surface of said first member.

2. The device set forth in claim 1, wherein said foil assembly further includes a resilient element disposed between said foils and the second member.

3. The device set forth in claim 1, wherein at least one of said foils has a convoluted portion which provides resiliency between the foils and the second member.

4. The device set forth in claim 1, wherein each of said foils has a flat surface disposed substantially parallel to the planar surface of the first member.

5. The device set forth in claim 1, wherein said foils are overlapped.

6. For use in a linear bearing device wherein at least two parts are in linear motion relative to one another, a plurality of foils disposed between the two parts and fixedly mounted relative to one of said parts.

7. The arrangement set forth in claim 6, wherein said foils comprise relatively thin sheets arranged in overlapping relation with each sheet affixed to an adjacent sheet.

8. The arrangement set forth in claim 6, wherein said foils comprise relatively thin sheets arranged in overlapping relation with all sheets being affixed to a common base.

9. The arrangement set forth in claim 6, wherein said foils comprise relatively thin metal and plastic sheets alternately interleaved.

10. The arrangement set forth in claim 9, wherein each of the plastic sheets has at least one hole through which an adjacent metal sheet is affixed to a common base.

References Cited

UNITED STATES PATENTS

| | | | |
|---|---|---|---|
| 2,352,911 | 7/1944 | Osplack | 308—35 |
| 3,301,611 | 1/1967 | Dunlap | 308—35 |
| 3,382,014 | 5/1968 | Marley | 308—9 |
| 3,231,319 | 1/1966 | Porath | 308—5 |
| 3,272,568 | 9/1966 | Koorneef | 308—5 |

MARTIN P. SCHWADRON, Primary Examiner

L. L. JOHNSON, Assistant Examiner

U.S. Cl. X.R.

308—5; 310—13